United States Patent
Schneider

(10) Patent No.: US 8,190,876 B2
(45) Date of Patent: May 29, 2012

(54) RENEGOTIATING SSL/TLS CONNECTIONS WITH CLIENT CERTIFICATES ON POST REQUESTS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1223 days.

(21) Appl. No.: 11/986,248

(22) Filed: Nov. 19, 2007

(65) Prior Publication Data

US 2009/0132807 A1    May 21, 2009

(51) Int. Cl.
*H04L 29/06* (2006.01)
(52) U.S. Cl. .......................... 713/152; 726/14
(58) Field of Classification Search .................. 713/152, 713/176; 726/14
See application file for complete search history.

(56) References Cited

U.S. PATENT DOCUMENTS

| | | | |
|---|---|---|---|
| 5,754,774 A * | 5/1998 | Bittinger et al. | 709/203 |
| 6,044,398 A * | 3/2000 | Marullo et al. | 709/219 |
| 2002/0199007 A1* | 12/2002 | Clayton et al. | 709/230 |
| 2003/0018918 A1* | 1/2003 | Natsuno et al. | 713/201 |
| 2003/0217291 A1* | 11/2003 | Schramm-Apple et al. | 713/201 |
| 2004/0111391 A1* | 6/2004 | Fujita et al. | 707/1 |
| 2007/0005982 A1* | 1/2007 | Kato | 713/176 |
| 2008/0307517 A1* | 12/2008 | Grigoriev et al. | 726/9 |

* cited by examiner

*Primary Examiner* — Hadi Armouche
(74) *Attorney, Agent, or Firm* — Lowenstein Sandler PC

(57) ABSTRACT

A method and apparatus for providing securing a connection with a (Secure Sockets Layer) SSL/TLS-enabled server. In one embodiment, a web client establishes a new connection by initiating a communication with the SSL/TLS-enabled server. The communication includes a non-POST request. After the client negotiates the secured connection with the server in response to the non-POST request, the client submits a POST request to the SSL/TLS-enabled server via the secured connection.

16 Claims, 5 Drawing Sheets

———Client Hello 302———▶

◀——(Setup SSL session) 304——▶

———GET or HEAD request 306——▶

◀——Server Hello request 308———

◀——(Verify Client Cert) 310——▶

◀———GET or HEAD request response 312        SERVER CAN RESPOND
                                              TO CLIENT REQUEST
                                              SINCE CLIENT CERT
———POST request 314———▶        ALREADY RECEIVED

RENEGOTIATING SSL/TLS CONNECTIONS WITH CLIENT CERTIFICATES ON POST REQUESTS

TECHNICAL FIELD

Embodiments of the present invention relate to secured communications, and more particularly, to securing communications between a server and a client with a post request.

BACKGROUND

A POST request is a request that submits data to be processed (e.g. from an HTML form) to the identified resource. The data is included in the body of the request. This may result in the creation of a new resource or the updates of existing resources or both. When a client sends a POST request to a resource of a secured server that requires a client certificate, the secured server cannot respond to the body of POST request from the client until the client either provides a client certificate and renegotiates the connection, or sends an indication that it is not going to do so. Thus, the client has no way of knowing how much of the request body has been received and discarded. As such, a secured server that requires client certificates typically aborts POST requests, if the request is the first one on a connection.

One solution involves the server buffering the entire request, and then sending the client certificate request. However, if the server is not in a position to buffer the entire request, the POST operation is aborted. Another solution involves configuring the server to always ask for a client certificate signed by a single certificate authority. One has to be able to control the server. However, it may not also be possible in the case where the server requires client certificates with more than a single signature authority.

DESCRIPTION OF THE DRAWINGS

The present invention is illustrated by way of example, and not by way of limitation, in the figures of the accompanying drawings and in which.

DETAILED DESCRIPTION

Described herein is a method and apparatus for securing a connection with a (Secure Sockets Layer) SSL/(Transport Layer Security) TLS-enabled server. In one embodiment, a web client (e.g. a web browser) establishes a new connection by initiating a communication with the SSL/TLS-enabled server. The communication includes a non-POST request. After the web client negotiates the secured connection with the SSL/TLS-enabled server in response to the non-POST request, the web client submits a POST request to the SSL/TLS-enabled server via the secured connection.

Figure 1:
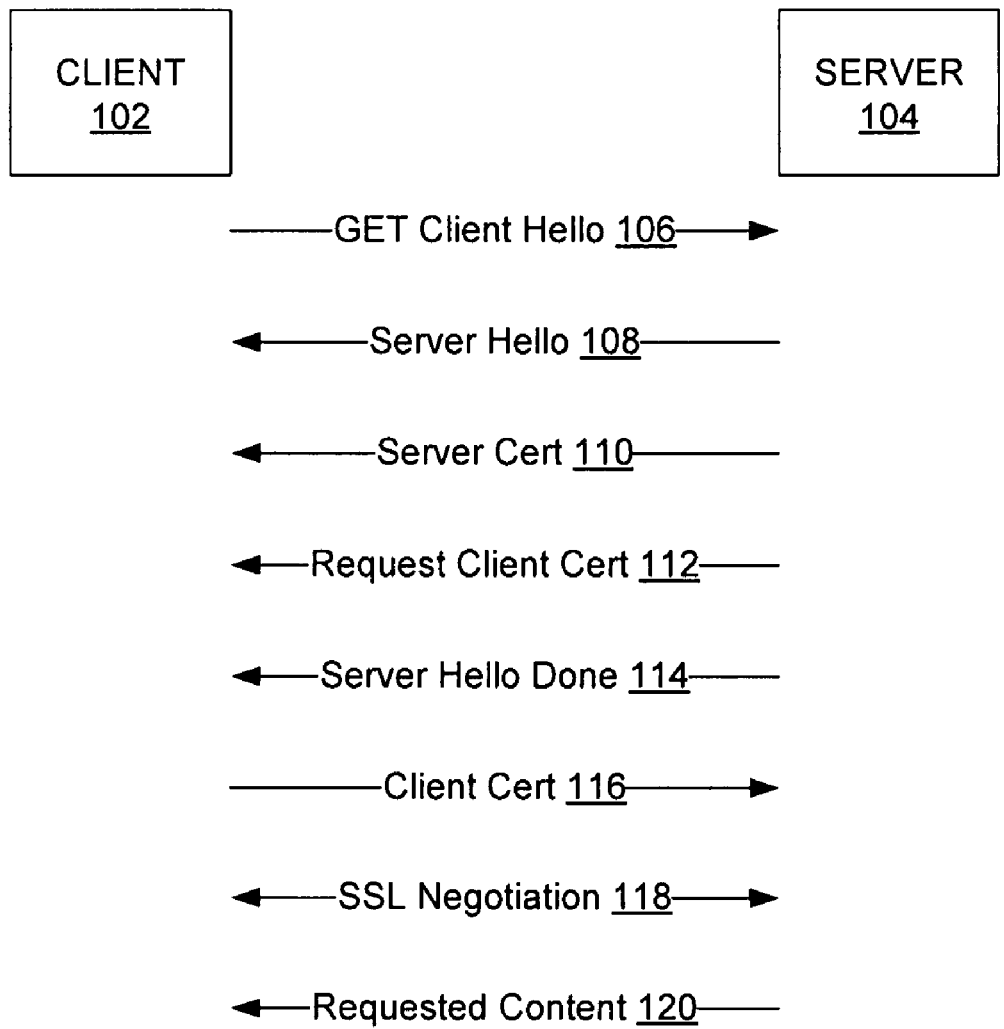
FIG. 1 is a block diagram illustrating a client establishing a secured connection with a SSL/TLS-enabled server with a GET request.

FIG. 1 is a block diagram illustrating a web client establishing a secured connection with a SSL/TLS-enabled server with a GET request. A web client 102 communicates with a server 104 via a network (e.g. Internet, not shown). For example, web client 102 may include personal computers (PCs), wireless telephones, palm-sized computing devices, personal digital assistants (PDAs), consumer electronic devices, etc. In one embodiment, web client 102 may include a web browser (not shown). The network connecting web client 102 to server 104 may include a public network (e.g., Internet) or a private network (e.g., Ethernet or a local area Network (LAN)).

Server 104 may be a SSL/TLS-enabled server allowing web client to establish a secured connection with server 104 to prevent eavesdropping, tampering, and message forgery. SSL/TLS provides endpoint authentication and communications privacy over the Internet using cryptography. Typically, only the server is authenticated (i.e., its identity is ensured) while the web client remains unauthenticated; this means that the end user (whether an individual or an application, such as a Web browser) can be sure with whom they are communicating. The next level of security—in which both ends of the "conversation" are sure with whom they are communicating—is known as mutual authentication. Mutual authentication requires public key infrastructure (PKI) deployment to clients.

Client 102 and server 104 negotiate a secured connection by using a handshaking procedure. During this handshake, web client 102 and server 104 agree on various parameters used to establish the connection's security. First, web client 102 sends a ClientHello message 106 specifying the highest SSL/TLS protocol version it supports, a random number, a list of suggested cipher suites and compression methods web client 102 may also send a GET request to server 104 along with the ClientHello message 106.

Server 104 responds with a ServerHello 108, containing the chosen protocol version, a random number, cipher suite, and compression method from choices offered by web client 102. Server 104 also sends its certificate 110. Server certificate 110 may include the server name, the trusted certificate authority (CA), and the server's public encryption key. Server 104 may also request a certificate from web client 102, so that the connection can be mutually authenticated, using a CertificateRequest 112. Server 104 sends a ServerHelloDone message 114, indicating it is done with handshake negotiation. In response, web client 102 sends a client certificate 116 to server 104.

SSL/TLS negotiation 118 between web client 102 and server 104 may include the following: web client 102 sending a ClientKeyExchange message, which may contain a PreMasterSecret, public key, or nothing web client 102 and Server 104 then use the random numbers and PreMasterSecret to compute a common secret, called the "master secret". All other key data is derived from this master secret (and the client- and server-generated random values), which is passed through a carefully designed "pseudorandom function". The web client now sends a ChangeCipherSpec message, essentially telling the Server, "Everything I tell you from now on will be encrypted."

Finally, web client 102 sends an encrypted Finished message, containing a hash and MAC over the previous handshake messages. Server 104 attempts to decrypt the web client's Finished message, and verify the hash and MAC. If the decryption or verification fails, the handshake is considered to have failed and the secured connection should fail. Finally, server 104 sends a ChangeCipherSpec and its encrypted Finished message, and web client 102 performs the same decryption and verification. At this point, the "handshake" is complete and the application protocol is enabled. Application messages exchanged between web client 102 and server 104 will be encrypted. Server 104 finally responds to web client 102 GET request by sending the requested content.

In the above example, in the case of a GET request that only include a request header, server 104 knows that it needs to request a client certificate after it has received the first line of the request. So server 104 will wait until it has received the entire header and then ask web client 102 for the client certificate 116. Upon successful authentication, server 104 returns the requested content.

Figure 2:
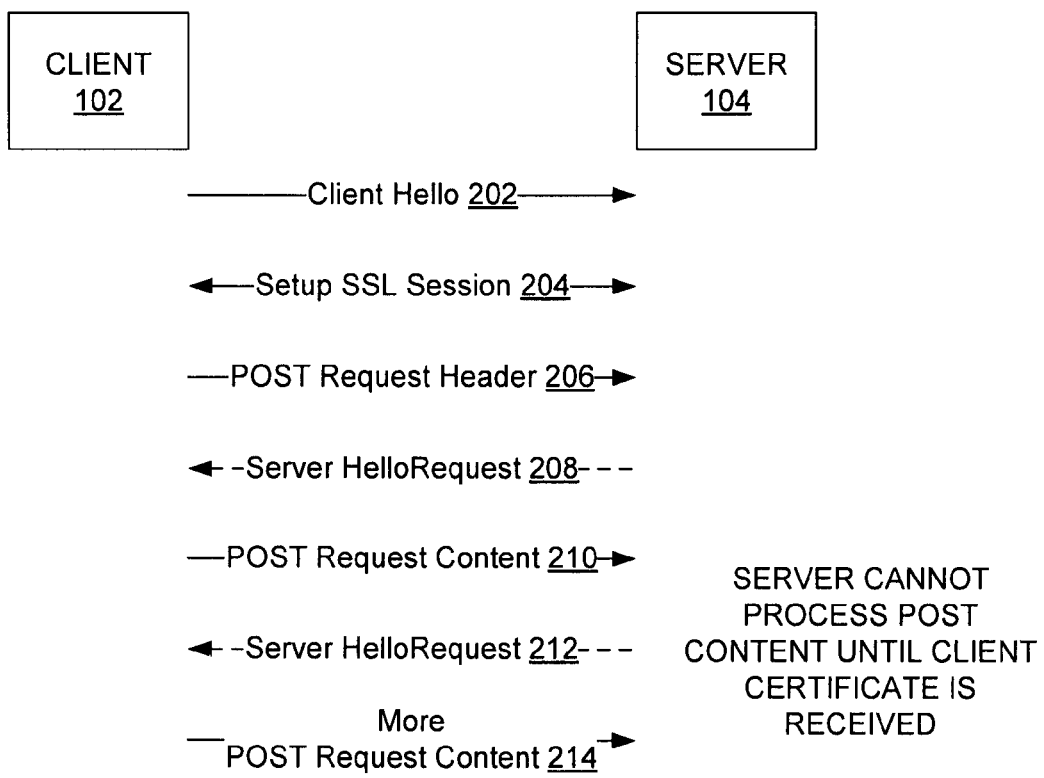
FIG. 2 is a block diagram illustrating a client establishing a secured connection with a SSL/TLS-enabled server with a POST request.

FIG. 2 is a block diagram illustrating a web client establishing a secured connection with a SSL/TLS-enabled server on a POST request. Web client 102 sends a ClientHello message 202. A secured session 204 is negotiated. Web client 102 sends a POST request header 206. Server 104 responds with a ServerHello request 208. Web client 102 sends the POST request content 210 to server 104. Server 104 cannot process the POST request content 210 until the web client certificate is received. As such, server 103 again sends a ServerHello request 212. Web client 102 keeps on sending more POST request content 214.

Server 104 cannot process the POST request from web client 102 until all of the requirements for the particular resource being targeted are satisfied (which, in the case of a resource requiring client certificate authentication, would include renegotiating the session with a client certificate). When server 104 recognizes that the resource in question requires renegotiation, it sends an immediate HelloRequest 208, 212 to web client 102 so that web client 102 knows that it needs to renegotiate the connection. In the mean time, web client 102 may have started sending the POST request content, and the data coming from web client 102 has to be acknowledged (otherwise, the ClientHello message the server wants will never come through). Once acknowledged, web client 102 can reasonably presume it no longer needs to store it itself (meaning the server would have to buffer it). Server 104 cannot do that without being vulnerable (a malicious client could run the server out of memory). So, server 104 sends an error response back to the client and aborts the connection. As such, a resource of the SSL/TLS-enabled web server that requires client certificates for some requests typically aborts POST requests that require client certificates, if the request is the first one on a connection.

Figure 3:
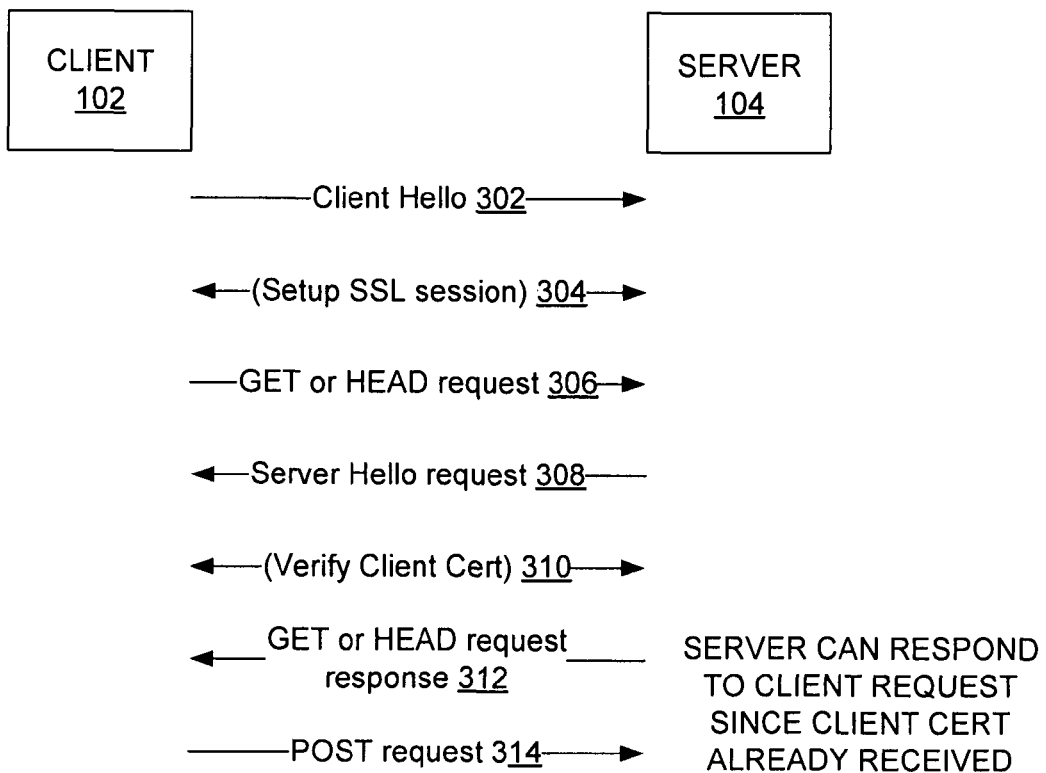
FIG. 3 is a block diagram illustrating a client establishing a secured connection in accordance with one embodiment.

FIG. 3 is a block diagram illustrating a web client establishing a secured connection in accordance with one embodiment. On a new connection, web client 102 submits a Client Hello 302 to SSL/TLS-enabled server 104. A SSL/TLS negotiation 304 is negotiated web client 102 sends a non-POST request (e.g. GET or HEAD request 306) to server 104. In one embodiment, the non-POST request includes a safe request without side effects, i.e. requests intended for information retrieval without changing the state of the server. HEAD, GET, OPTIONS, and TRACE are examples of safe requests. A preferred embodiment is to submit a GET request. FIG. 3 illustrates an example where a GET or HEAD request is initially submitted on a new connection with server 104.

Server 104 responds with a ServerHello 308, containing the chosen protocol version, a random number, cipher suite, and compression method from choices offered by web client 102. Server 104 verifies the Client Certificate 310. Upon successful authentication, server 104 responds to web client 102 request with GET or HEAD request response 312. Server 104 can now proceed with a POST request 314 since the client certificate has already been received by server 104.

Thus, in the case where client certificate's signature authority cannot be known in advance, a non-POST request is submitted, and then once the connection has been renegotiated with the client certificate, the POST request is then made. In one embodiment, every POST request is preceded by either a GET or a HEAD request as the first request on a connection. It should be noted that the GET or HEAD request is for the same resource that the POST request will go to.

Figure 4:
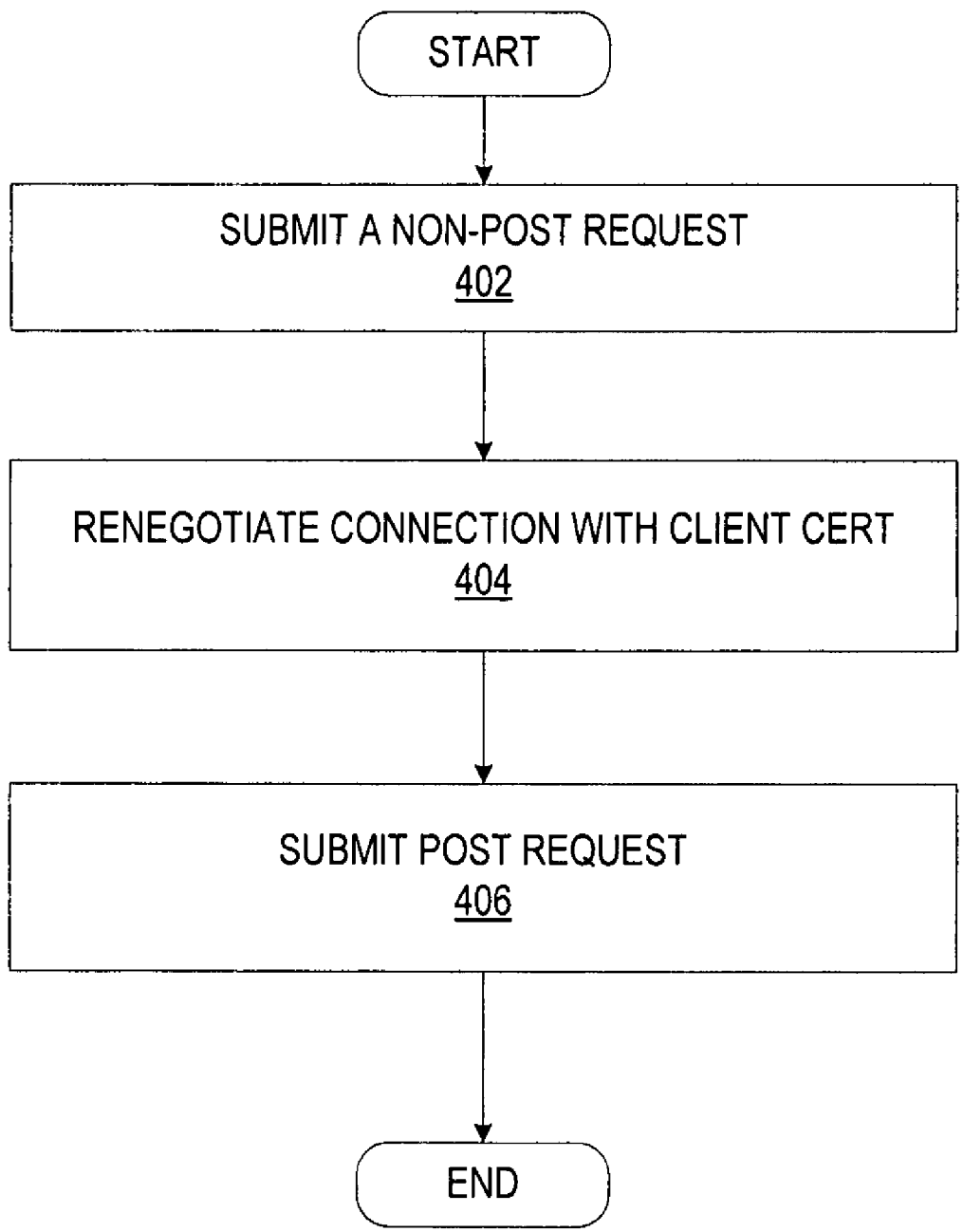
FIG. 4 is a flow diagram of one embodiment of a method for securing a communication with a SSL/TLS-enabled server.

FIG. 4 is a flow diagram of one embodiment of a method for securing a communication with a SSL/TLS-enabled server. At 402, a web client submits a non-POST request on a first connection to the SSL/TLS-enabled server. At 404, the SSL/TLS-enabled server renegotiates the connection with the web client to secure the communication using the SSL/TLS-enabled server certificate and the client certificate. At 406, upon successful authentication, the web client submits a POST request to the SSL/TLS-enabled server. The SSL/TLS-enabled server is able to process the POST request since it has already received the client certificate.

Figure 5:
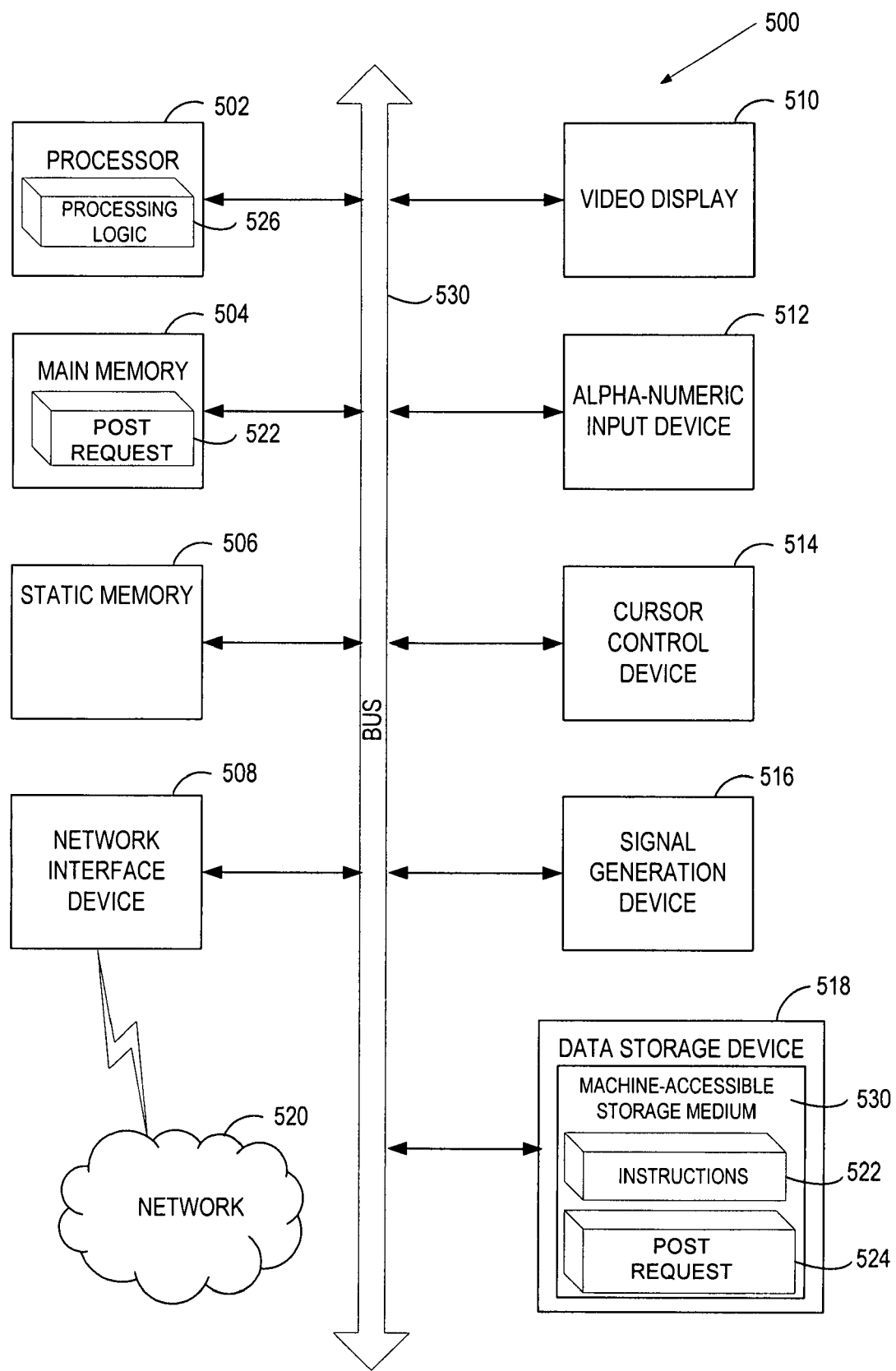
FIG. 5 is a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store a web-browser module 524 for preceding a POST request with a non-POST request. The web browser module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
negotiating, by a client computing device executing an application, a secured connection with a server without authenticating the client computing device to the server, wherein the secured connection is secured using a secured sockets layer/transport layer security (SSL/TLS) protocol;
making a determination, by the client computing device, to access a server resource that requires client authentication;
in response to the determination, sending a non-POST request to the server to initiate a new secured connection, the non-POST request indicating the server resource;
negotiating the new secured connection with the server, the negotiating of the new secured connection comprising sending a client certificate to the server and authenticating the client computing device to the server; and
submitting a hypertext transfer protocol (HTTP) POST request to the server via the new secured connection, the HTTP POST request indicating the server resource.

2. The method of claim 1, wherein negotiating the secured connection comprises sending a ClientHello message to the server.

3. The method of claim 2, wherein negotiating the secured connection comprises receiving server certificate that includes a server name, a server trusted certificate authority (CA), and a server's public encryption key.

4. The method of claim 1 wherein the non-POST request comprises at least one of an HTTP GET request or an HTTP HEAD request.

5. A non-transitory machine-accessible storage medium including data that, when accessed by a machine, cause the machine to perform a method comprising:
    negotiating, by an application executing on the machine, a secured connection with a server without authenticating the machine to the server, wherein the secured connection is secured using a secured sockets layer/transport layer security (SSL/TLS) protocol;
    determining, by the application, to access a server resource that requires client authentication;
    in response to the determining, sending a non-POST request to the server to initiate a new secured connection, the non-POST request indicating the server resource;
    negotiating a new secured connection with the server, the negotiating of the new secured connection comprising sending a client certificate to the server and authenticating the machine to the server; and
    submitting a hypertext transfer protocol (HTTP) POST request to the server via the new secured connection, the HTTP POST request indicating the server resource.

6. The non-transitory machine-accessible storage medium of claim 5, wherein negotiating the new secured connection further comprises
    receiving a ServerHello message including server certificate and a request for the client certificate.

7. The non-transitory machine-accessible storage medium of claim 6 wherein the server certificate includes a server name, a server trusted certificate authority (CA), and a server's public encryption key.

8. The non-transitory machine-accessible storage medium of claim 5, wherein the non-POST request comprises at least one of an HTTP GET request or an HTTP HEAD request.

9. A client computing device comprising:
    a memory, to store instructions for an application; and
    a processing device, coupled to the memory, wherein the processing device is configured to:
    negotiate a secured connection with a server without authenticating the client computing device to the server, wherein the secured connection is secured using a secure sockets layer/transport layer security (SSL/TLS) protocol;
    make a determination to access a server resource that requires client authentication;
    in response to making the determination, send a non-POST request to the server to initiate a new secured connection, the non-POST request indicating the server resource;
    negotiate the new secured connection with the server, the negotiating of the new secured connection comprising sending a client certificate to the server and authenticating the client computing device to the server; and
    submit a hypertext transfer protocol (HTTP) POST request to the server via the new secured connection, the HTTP POST request indicating the server resource.

10. The client computing device of claim 9, wherein negotiating the secured connection comprises sending a ClientHello message to the server.

11. The client computing device of claim 10, wherein negotiating the secured connection comprises receiving a server certificate that includes a server name, a server trusted certificate authority (CA), and a server's public encryption key.

12. The client computing device of claim 9, wherein the non-POST request comprises at least one of an HTTP GET request or an HTTP HEAD request.

13. The client computing device of claim 9, wherein the application comprises a web browser.

14. The method of claim 1, further comprising:
    receiving a ServerHello message from the server in response to sending the non-POST request;
    negotiating the new secured connection with the server in response to receiving the ServerHello message;
    receiving a response to the non-POST request from the server after the new secured connection is negotiated; and
    submitting the HTTP POST request in response to receiving the response.

15. The non-transitory machine-accessible storage medium of claim 5, the method further comprising:
    receiving a ServerHello message from the server in response to sending the non-POST request;
    negotiating the new secured connection with the server in response to receiving the ServerHello message;
    receiving a response to the non-POST request from the server after the new secured connection is negotiated; and
    submitting the HTTP POST request in response to receiving the response.

16. The client computing device of claim 9, wherein the processing device is further configured to:
    receive a ServerHello message from the server in response to sending the non-POST request;
    negotiate the new secured connection with the server in response to receiving the ServerHello message;
    receive a response to the non-POST request from the server after the new secured connection is negotiated; and
    submit the HTTP POST request in response to receiving the response.

* * * * *